United States Patent
Kanazawa

(10) Patent No.: US 12,459,397 B2
(45) Date of Patent: Nov. 4, 2025

(54) POWER TRANSFER MANAGING SYSTEM, COMPUTER-READABLE STORAGE MEDIUM, AND METHOD FOR PLURALITY OF VEHICLES

(71) Applicant: HONDA MOTOR CO., LTD., Tokyo (JP)

(72) Inventor: Hiroyuki Kanazawa, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 440 days.

(21) Appl. No.: 18/176,483

(22) Filed: Mar. 1, 2023

(65) Prior Publication Data

US 2023/0286411 A1 Sep. 14, 2023

(30) Foreign Application Priority Data

Mar. 11, 2022 (JP) ................... 2022-038041

(51) Int. Cl.
*B60L 55/00* (2019.01)
*B60L 53/63* (2019.01)
(Continued)

(52) U.S. Cl.
CPC ............... *B60L 55/00* (2019.02); *B60L 53/63* (2019.02); *B60L 53/67* (2019.02); *G05B 19/042* (2013.01);
(Continued)

(58) Field of Classification Search
CPC .......... B60L 55/00; B60L 53/67; B60L 53/63; H02J 3/004; G05B 19/042; G05B 2219/2639
(Continued)

(56) References Cited

U.S. PATENT DOCUMENTS

2015/0202976 A1* 7/2015 Bridges ................... B60L 53/63
320/109
2019/0202415 A1 7/2019 Lai
(Continued)

FOREIGN PATENT DOCUMENTS

EP 3363676 A1 8/2018
EP 3855550 A1 7/2021
(Continued)

OTHER PUBLICATIONS

Extended European Search Report for counterpart European Application No. 23157057.3, issued by the European Patent Office on Jul. 26, 2023.

*Primary Examiner* — Md Azad

(57) ABSTRACT

A system includes a control unit configured to select, from among a plurality of vehicles, a vehicle to be put on standby in a state where a power supply state is turned on to be able to provide a power resource to a power network, and perform control to bring the selected vehicle into a state where the power resource is able to be provided to the power network, and to cause another vehicle to sleep. The control unit is configured to sequentially select a vehicle, which is to be put on standby in a state where the power resource is able to be provided in order to provide a primary adjustment force to the power network, from among a plurality of vehicles belonging to the same group of groups divided by estimating an amount of power resource which is able to be provided to the power network.

10 Claims, 10 Drawing Sheets

(51) Int. Cl.
    *B60L 53/67*     (2019.01)
    *G05B 19/042*     (2006.01)
    *H02J 3/00*     (2006.01)

(52) U.S. Cl.
    CPC ...... *H02J 3/004* (2020.01); *G05B 2219/2639* (2013.01)

(58) Field of Classification Search
    USPC .......................................................... 700/295
    See application file for complete search history.

(56) References Cited

U.S. PATENT DOCUMENTS

| | | |
|---|---|---|
| 2019/0202416 A1 | 7/2019 | Lai |
| 2020/0009990 A1 | 1/2020 | Shiiyama |
| 2020/0018800 A1 | 1/2020 | Oshima |
| 2022/0200335 A1* | 6/2022 | Hamada .................. B60L 50/70 |
| 2022/0289060 A1* | 9/2022 | Tsuchiya ........... H02J 13/00006 |
| 2023/0226939 A1* | 7/2023 | Ehara ...................... B60L 53/62 |
| | | 320/109 |

FOREIGN PATENT DOCUMENTS

| | | |
|---|---|---|
| EP | 3972031 A1 | 3/2022 |
| JP | 2018160073 A | 10/2018 |
| JP | 2018160364 A | 10/2018 |
| JP | 2019164989 A | 9/2019 |
| JP | 2021103549 A | 7/2021 |

\* cited by examiner

POWER TRANSFER MANAGING SYSTEM, COMPUTER-READABLE STORAGE MEDIUM, AND METHOD FOR PLURALITY OF VEHICLES

The contents of the following Japanese patent application(s) are incorporated herein by reference:
NO. 2022-038041 filed in JP on Mar. 11, 2022.

BACKGROUND

1. Technical Field

The present invention relates to a system, a computer-readable storage medium, and a method.

2. Related Art

Patent Documents 1 to 4 disclose a technique related to charging and discharging of a storage battery.

CITATION LIST

Patent Document 1: Japanese Patent Application Publication No. 2018-160364
Patent Document 2: Japanese Patent Application Publication No. 2018-160073
Patent Document 3: Japanese Patent Application Publication No. 2019-164989
Patent Document 4: Japanese Patent Application Publication No. 2021-103549

DESCRIPTION OF EXEMPLARY EMBODIMENTS

Hereinafter, embodiments of the present invention will be described, but the embodiments do not limit the invention according to the claims. In addition, not all of the combinations of features described in the embodiments are essential to the solving means of the invention.

Figure 1:
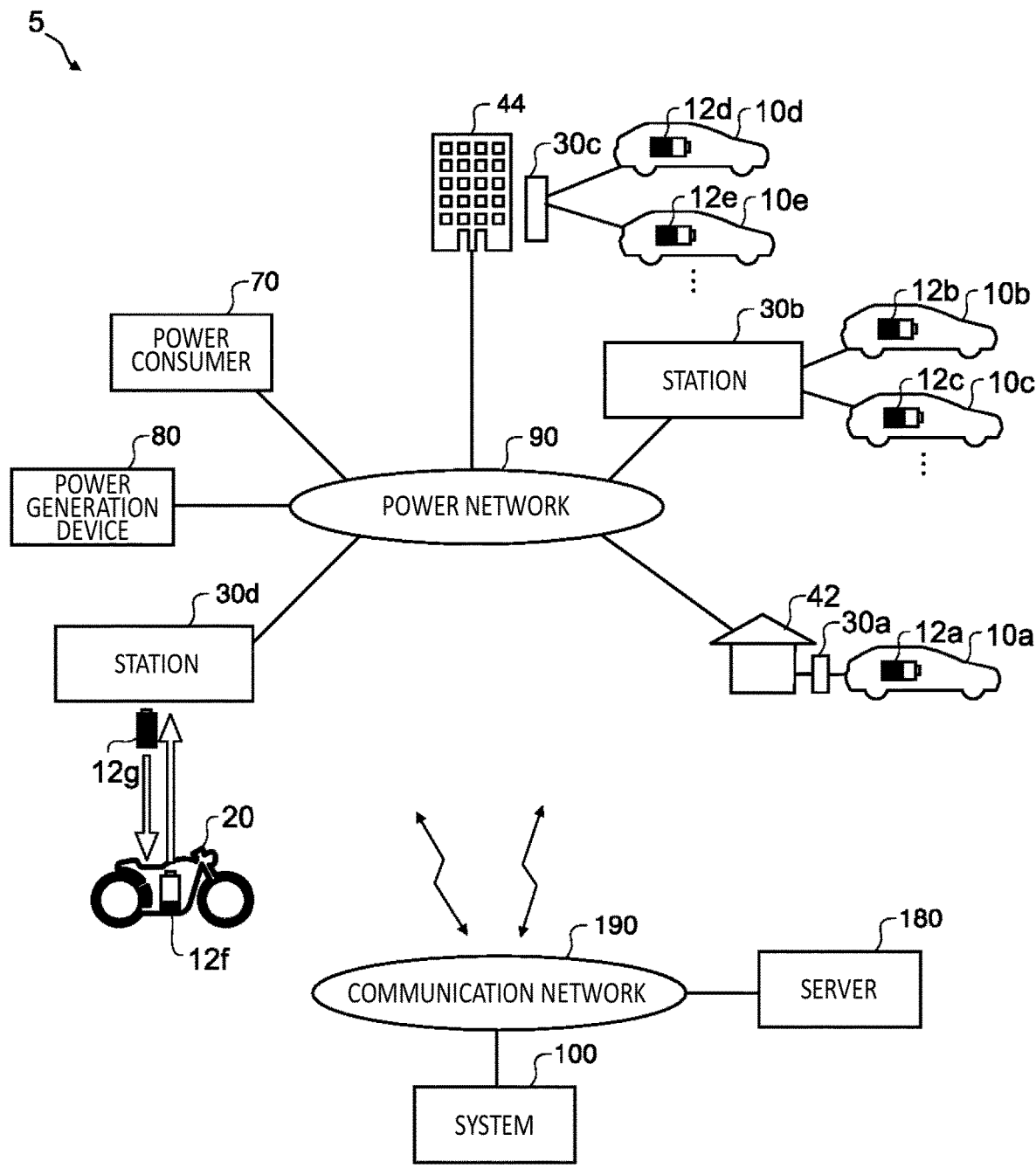
FIG. 1 conceptually illustrates a utilization form of a power system 5 in an embodiment.

FIG. 1 conceptually illustrates a utilization form of a power system 5 in an embodiment. The power system 5 includes a station 30a, a station 30b, a station 30c, and a station 30d, a power generation device 80, a system 100, a server 180, a vehicle 10a, a vehicle 10b, a vehicle 10c, a vehicle 10d, a vehicle 10e, and a vehicle 20.

In the present embodiment, the station 30a, the station 30b, the station 30c, and the station 30d may be collectively referred to as "station(s) 30". The vehicle 10a, the vehicle 10b, the vehicle 10c, the vehicle 10d, and the vehicle 10e may be collectively referred to as "vehicle(s) 10". The vehicle 10a, the vehicle 10b, the vehicle 10c, the vehicle 10d, and the vehicle 10e include a battery 12a, a battery 12b, a battery 12c, a battery 12d, and a battery 12e, respectively. The battery 12a, the battery 12b, the battery 12c, the battery 12d, and the battery 12e may be collectively referred to as "battery(ies) 12".

The system 100 is connected to the server 180 through a communication network 190. The server 180 can communicate with the station 30 through the communication network 190. The system 100 controls the stations 30 through the communication network 190. The system 100 communicates with the vehicle 10 through the communication network 190, and acquires various types of information of the vehicle 10, such as a travel history of the vehicle 10 and an SOC of the battery 12.

The station 30, a power consumer 70, and the power generation device 80 are connected to a power network 90. The power generation device 80 includes, for example, a power plant operated by a power company. The power generated by the power generation device 80 can be supplied to the station 30 and the power consumer 70 through the power network 90. The power network 90 is, for example, a power system.

The station 30 charges and discharges the battery 12 mounted on the vehicle 10 connected thereto. The vehicle 10 is, for example, an electric car. The battery 12 is a battery that supplies power for traveling of the vehicle 10. The vehicle 10 may be a vehicle owned by an individual, a vehicle used by a business operator for business, a share car, or the like. The battery 12 is an example of a movable battery. The battery 12 can be made movable in a state of being mounted on the vehicle 10.

The station 30a is provided in a personal house 42, and charges and discharges the battery 12a of the vehicle 10a connected to the station 30a. The station 30b is a public charging/discharging station, and charges and discharges the batteries 12 mounted on a plurality of vehicles 10 including the vehicle 10b and the vehicle 10c connected to the station 30b. The station 30c is a station provided in a facility 44, and charges and discharges the batteries 12 mounted on a plurality of vehicles 10 including the vehicle 10d and the vehicle 10e connected to the station 30c.

The station 30d holds a plurality of batteries mountable on the vehicle 20, and charges and discharges the plurality of batteries held. The vehicle 20 is, for example, an electric motorcycle. A battery 12f used in the vehicle 20 is exchanged at the station 30. As an example, the battery 12f used for traveling of the vehicle 20 is exchanged with a battery 12g charged in the station 30d and is attached to the vehicle 20. The battery 12f and the battery 12g are examples of movable batteries. The battery 12f and the battery 12g can be moved by being mounted on the vehicle 20. The battery 12f and the battery 12g can also be moved by being hand-carried by a person.

Each of the stations 30 can charge the battery 12 with power supplied from the power network 90. The station 30 can discharge the battery 12 to supply power to the power network 90.

Each of the stations 30 charges and discharges the battery 12 according to the control of the system 100. For example, when a power deficit occurs in the power network 90, the system 100 can supply power to the power network 90 by causing the station 30 to discharge the battery 12. When there is power surplus in the power network 90, the system 100 can reduce the power surplus in the power network 90 by causing the station 30 to charge a battery. The system 100 can provide a primary adjustment force, a secondary adjustment force, and a tertiary adjustment force in the power network 90 by using the station 30. In this manner, the system 100 can aggregate and manage the plurality of batteries 12 as power resources for the power network 90.

The server 180 is, for example, a server used by a power aggregator. The server 180 performs power transaction in a power market. The system 100 can provide the server 180 with the battery 12 which is managed as a power resource. The system 100 controls charging and discharging of the station 30 for the battery and provides the power network 90 with an amount of power agreed by the server 180. For example, the system 100 controls charging and discharging of the station 30 for the battery 12 according to a demand from the server 180, and provides an amount of power corresponding to the demand.

Figure 2:
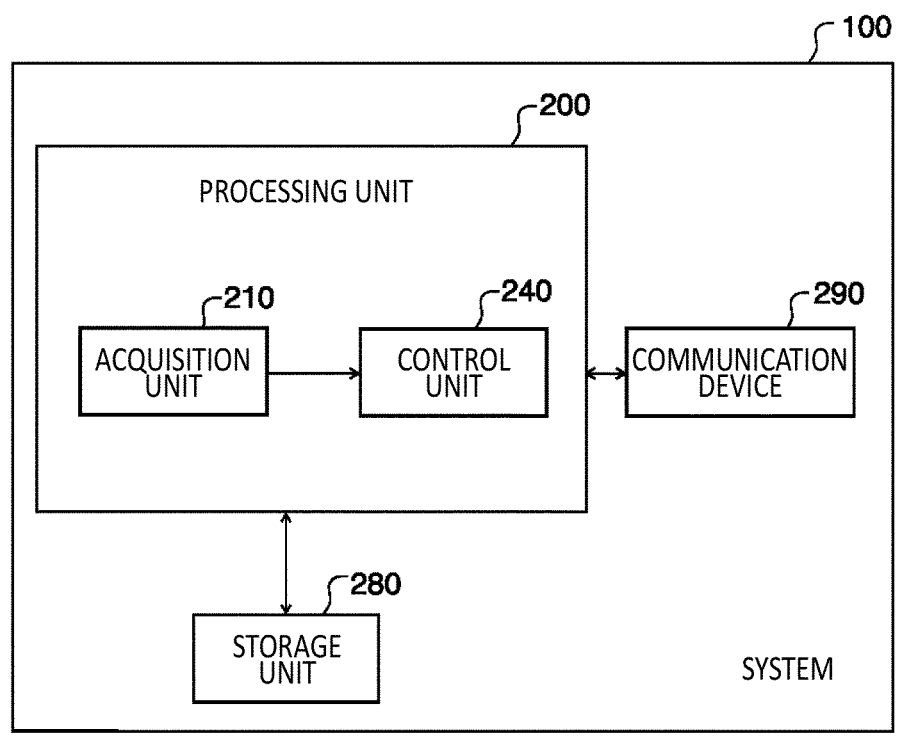
FIG. 2 illustrates an example of a system configuration of a system 100.

FIG. 2 illustrates an example of a system configuration of the system 100. The system 100 includes a processing unit 200, a storage unit 280, and a communication device 290.

The processing unit 200 controls the communication device 290. The communication device 290 is responsible for communication between the station 30a and the server 180. The processing unit 200 is realized by an arithmetic processing device including a processor. Each of the storage units 280 includes a nonvolatile storage medium. The processing unit 200 performs processing by using the information stored in the storage unit 280. The processing unit 200 may be realized by a microcomputer including a CPU, a ROM, a RAM, an I/O, a bus, and the like. The system 100 may be realized by a computer.

In the present embodiment, the system 100 is realized by a single computer. However, in another embodiment, the system 100 may be realized by a plurality of computers. At least some functions of the system 100 may be realized by one or more servers such as a cloud server.

The processing unit 200 includes an acquisition unit 210 and a control unit 240.

The acquisition unit 210 acquires the travel history of the vehicle 10 and the charge-discharge history of the battery 12. The acquisition unit 210 may acquire the travel history transmitted from the vehicle 10 to the system 100. The travel history of the vehicle 10 may include information in which the position of the vehicle 10 and the SOC of the battery 12 are associated with date and time. The acquisition unit 210 may acquire the charge-discharge history transmitted from the vehicle 10 to the system 100. The acquisition unit 210 may acquire the charge-discharge history of the battery 12 transmitted from the station 30. The charge-discharge history may include information in which the charge-discharge amount of the battery 12 is associated with the date and time. The acquisition unit 210 may acquire information indicating the current state of the vehicle 10. The current state of the vehicle 10 may include the current position of the vehicle 10, the current SOC of the battery 12, or the like. The control unit 240 may perform processing on the basis of the information acquired by the acquisition unit 210.

The control unit 240 selects, from among a plurality of vehicles 10, a vehicle 10 which is to be put on standby in a state where a power supply state is turned on and the power resource can be provided to the power network 90, and performs control to bring the selected vehicle 10 into a state where the power resource can be provided to the power network 90 and to cause another vehicle 10 to sleep. The control unit 240 sequentially selects a vehicle 10, which is to be put on standby in a state where the power resource can be provided in order to provide the primary adjustment force to the power network 90, from among a plurality of vehicles 10 belonging to the same group of groups divided by estimating an amount of power resource which can be provided to the power network 90. The power resource may be power or an amount of power. Providing the power resource to the power network 90 includes increasing the power demand of the power network 90 and decreasing the power demand of the power network 90, and does not mean only supplying power to the power network 90.

The control unit 240 may select at least three vehicle groups from among the plurality of vehicles 10 belonging to the same group, bring one vehicle group of the three vehicle groups to a first state which is a state where the power resource is provided to the power network 90, bring another vehicle group of the three vehicle groups to a second state which is a state where the power resource is able to be provided to the power network 90 and the power resource is not provided to the power network 90, and bring still another vehicle group of the three vehicle groups to a third state which is a sleep state. The control unit 240 may switch the state of each vehicle group of the three vehicle groups from the first state, the second state, and the third state in an order of being selected in a predetermined order.

When the primary adjustment force is provided to the power network 90, the control unit 240 may switch the state of each vehicle group of the three vehicle groups from the first state, the second state, and the third state in the order of being selected in the predetermined order.

When the primary adjustment force is not provided to the power network 90, the control unit 240 may set one vehicle group of the three vehicle groups to the second state, set the other two vehicle groups of the three vehicle groups to the third state, and switch the state of each vehicle group of the three vehicle groups from the second state and the third state in the order of being selected in the predetermined order.

The control unit 240 may divide the plurality of vehicles 10 into three or more groups on the basis of the state of charge of the battery 12 included in each of the plurality of vehicles 10, and sequentially select the vehicle 10, which is to be put on standby in a state where the power resource can be provided in order to provide the primary adjustment force, from among the plurality of vehicles 10 belonging to the group, which excludes the group having the highest state of charge and the group having the lowest state of charge, among the three or more groups.

Figure 3:
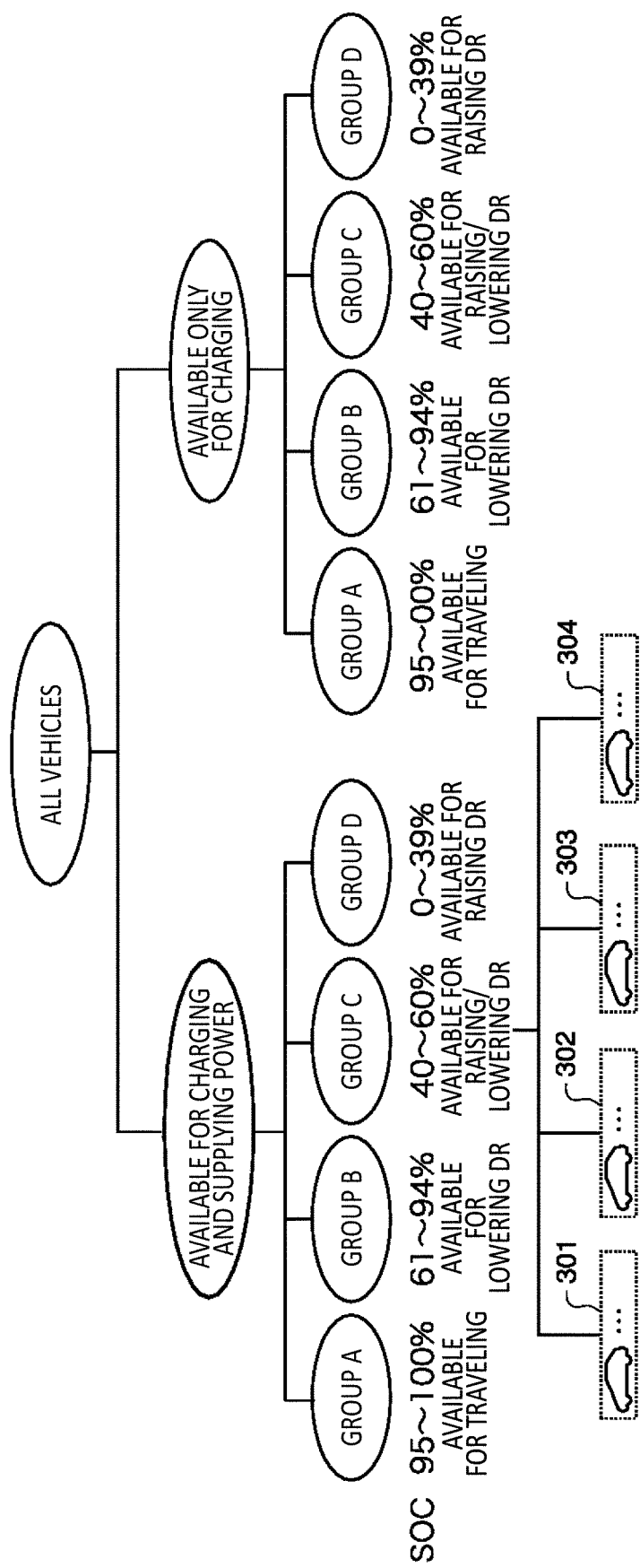
FIG. 3 schematically illustrates grouping of vehicles 10.

FIG. 3 schematically illustrates grouping of the vehicles 10. The control unit 240 divides the vehicles 10 connected to the station 30 into groups.

Specifically, the control unit 240 classifies the vehicles into the vehicle 10 available for charging and supplying power and the vehicle 10 available only for charging. The vehicle 10 available for charging and supplying power is the vehicle 10 connected to the station 30 which has a function of supplying power obtained by discharging the battery 12 to the power network 90 as well as a function of charging the battery 12. The vehicle 10 available only for charging is the vehicle 10 connected to the station 30 which has a function of charging the battery 12 and does not have a function of supplying power obtained by discharging the battery 12 to the power network 90.

The control unit 240 classifies each of the vehicles 10 available for charging and supplying power and the vehicles 10 available only for charging into groups A to D on the basis of the SOC of the battery 12. As an example, the group A has a vehicle on which the battery 12 having an SOC of 95% or more and 100% or less is mounted. The group B has a vehicle on which the battery 12 having an SOC of 61% or more and 94% or less is mounted. The group C has a vehicle on which the battery 12 having an SOC of 40% or more and 60% or less is mounted. The group D has a vehicle on which the battery 12 having an SOC of 0% or more and 39% or less is mounted.

The vehicle 10 belonging to the group A represents a vehicle available for traveling, that is, a vehicle that has completed traveling preparation. The vehicle 10 belonging to the group B is mainly a vehicle on which the battery 12 having a predetermined remaining battery capacity usable for a lowering demand response (DR) is mounted. The vehicle 10 belonging to the group C is mainly a vehicle on which the battery 12 having a remaining battery capacity usable for both the lowering DR and the raising DR is mounted. The vehicle 10 belonging to the group D is mainly a vehicle on which the battery 12 having a remaining battery capacity available for the raising DR is mounted.

The control unit 240 classifies the vehicles 10 which are in the state available for charging and supplying power and belong to the group C into four vehicle groups including a first vehicle group 301, a second vehicle group 302, a third vehicle group 303, and a fourth vehicle group 304. The first vehicle group 301, the second vehicle group 302, and the third vehicle group 303 have vehicles selected in order to provide the primary adjustment force to the power network 90. The fourth vehicle group 304 has vehicles other than the vehicles selected in order to provide the primary adjustment force to the power network 90.

Figure 4:
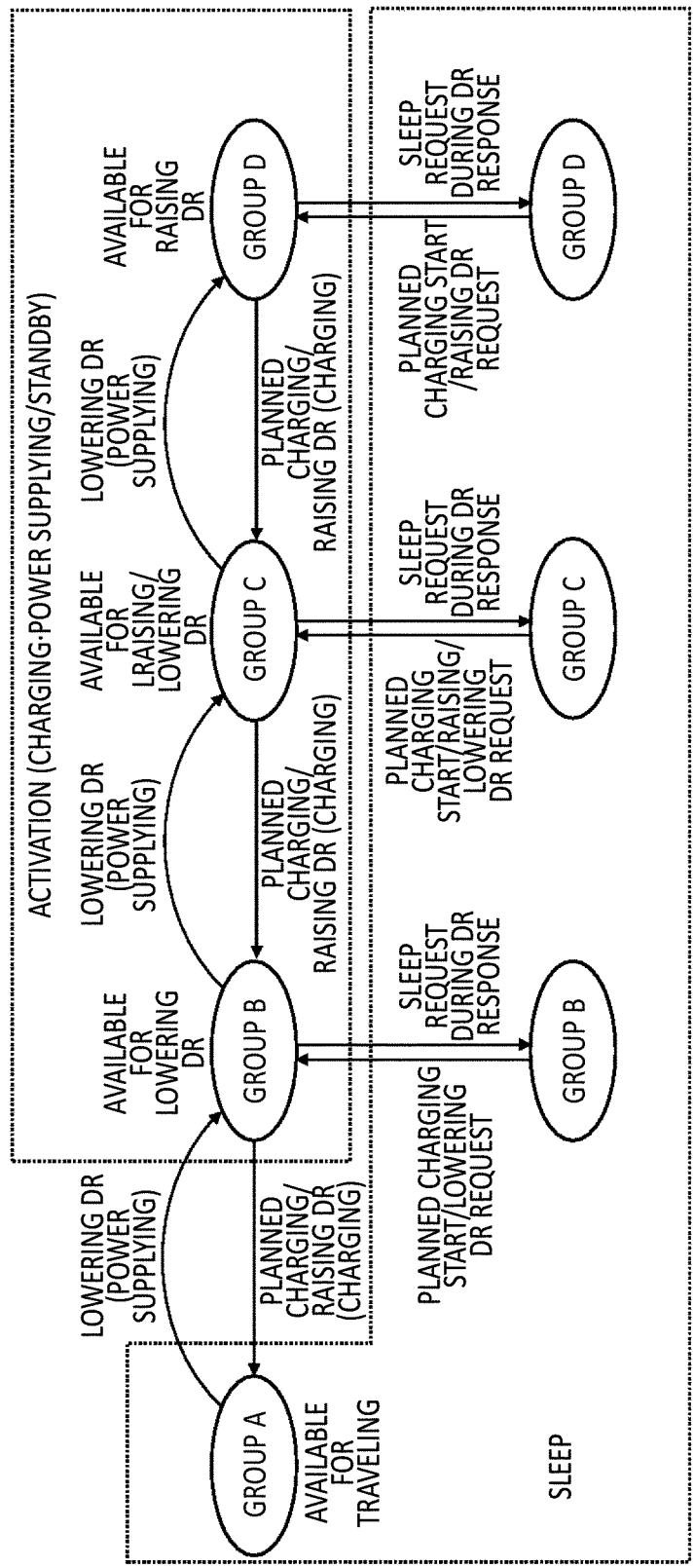
FIG. 4 schematically illustrates a state transition of the vehicle 10 available for charging and supplying power.

FIG. 4 schematically illustrates the state transition of the vehicle 10 available for charging and supplying power. The vehicle 10 has an activated state and a sleep state. The activated state is a state where the system power supply state of the vehicle 10 is turned on and power can be transferred to and from the power network 90. When the vehicle 10 is in the activated state, the vehicle 10 can take two states of a charging/power supplying state where the battery 12 is being charged or power is being supplied from the battery 12 to the outside of the vehicle 10, and a non-charging/power supplying state where the battery 12 is not charged or discharged.

When the vehicle 10 belongs to the group D in the activated state, the battery 12 is charged according to the planned charging of the battery 12 or the raising DR, whereby the vehicle 10 can transition to the state belonging to the group C. When the vehicle 10 belongs to the group C in the activated state, the battery 12 is charged according to the planned charging of the battery 12 or the raising DR, whereby the vehicle 10 can transition to the state belonging to the group B.

When the vehicle 10 belongs to the group B in the activated state, the battery 12 is charged according to the planned charging of the battery 12 or the raising DR, whereby the vehicle 10 can transition to the state belonging to the group A. In the group A, the vehicle 10 is in a state available for traveling, and when becoming the group A, the vehicle 10 transitions to the sleep state and becomes in a state where power is not supplied to the outside from the battery 12 mounted on the vehicle 10.

When the vehicle 10 belongs to the group A, power is supplied from the battery 12 to the outside according to the lowering DR, whereby the vehicle 10 can transition to the state belonging to the group B in the activated state. When the vehicle 10 belongs to the group B in the activated state, power is supplied from the battery 12 to the outside according to the lowering DR, whereby the vehicle 10 can transition to the state belonging to the group C. When the vehicle 10 belongs to the group C in the activated state, power is supplied from the battery 12 to the outside according to the lowering DR, whereby the vehicle 10 can transition to the state belonging to the group D.

In a case where the vehicle 10 belongs to the group D in the activated state, when a sleep request is received from the system 100 during a DR response, the vehicle 10 transitions to the state belonging to the group D in the sleep state. In a case where the vehicle 10 belongs to the group D in the sleep state, when the start of the planned charging or the raising DR request is received from the system 100, the vehicle 10 transitions to the state belonging to the group D in the activated state. In a case where the vehicle 10 belongs to the group C in the activated state, when the sleep request is received from system 100 during the DR response, the vehicle 10 transitions to the state belonging to the group C in the sleep state. In a case where the vehicle 10 belongs to the group C in the sleep state, when the start of the planned charging or the raising DR or lowering DR request is received from the system 100, the vehicle 10 transitions to the state belonging to the group C in the activated state. In a case where the vehicle 10 belongs to the group B in the activated state, when the sleep request is received from the system 100 during the DR response, the vehicle 10 transitions to the state belonging to the group B in the sleep state. In a case where the vehicle 10 belongs to the group B in the sleep state, when the start of the planned charging or the lowering DR request is received from the system 100, the vehicle 10 transitions to the state belonging to the group B in the activated state.

Figure 5:
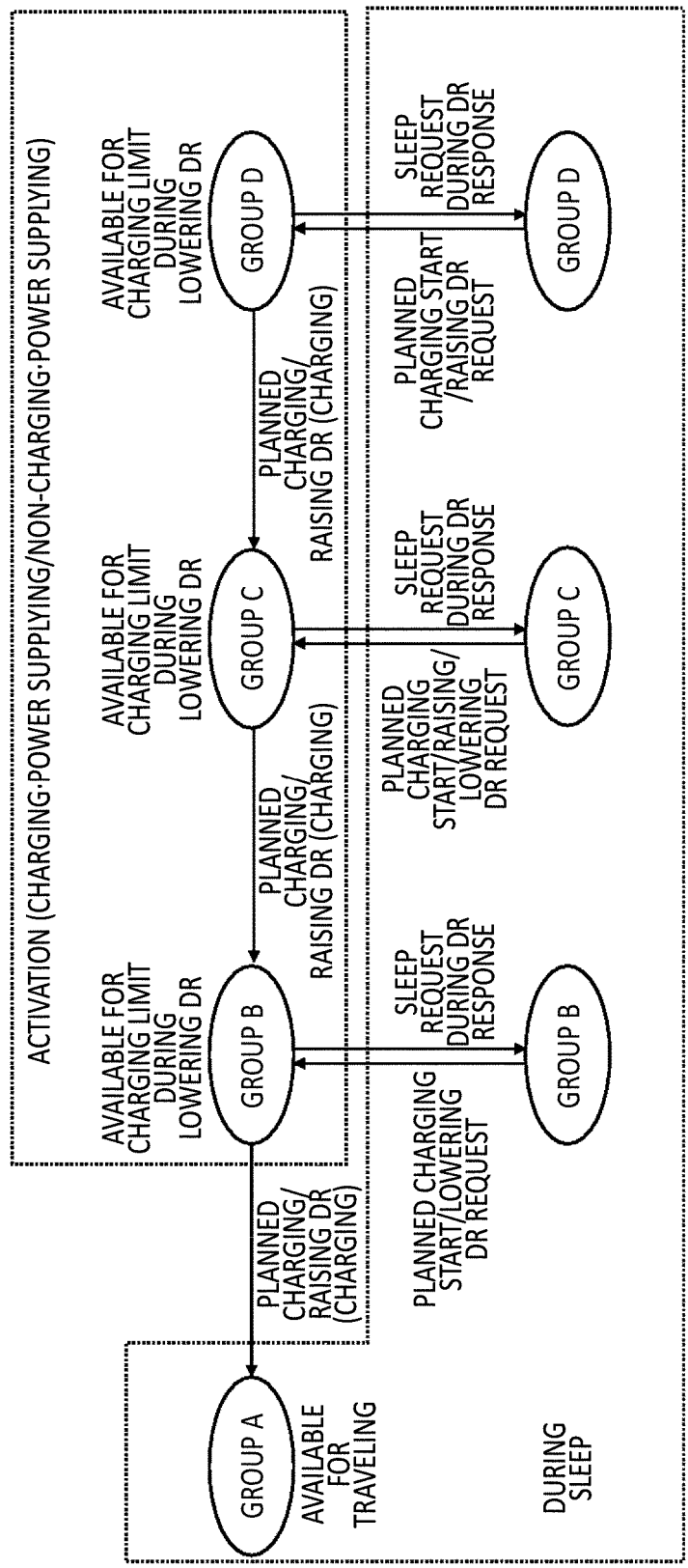
FIG. 5 schematically illustrates a state transition of the vehicle 10 in a state available only for charging.

FIG. 5 schematically illustrates the state transition of the vehicle 10 in a state available only for charging. In FIG. 5, a description of a part common to FIG. 4 will be omitted, and a part different from FIG. 4 will be described.

In the vehicle 10 in the state available only for charging, power cannot be supplied from the battery 12 to the outside, so that a state transition from the group A to the group B, a state transition from the group B to the group C, and a state transition from the group C to the group D are not performed. Since power cannot be supplied from the battery 12 to the outside, when the lowering DR request is received in the case of belonging to any one of the group B, the group C, and the group D, it is only possible to respond by limiting the charge of the battery 12, and the state transition is not performed.

Figure 6:
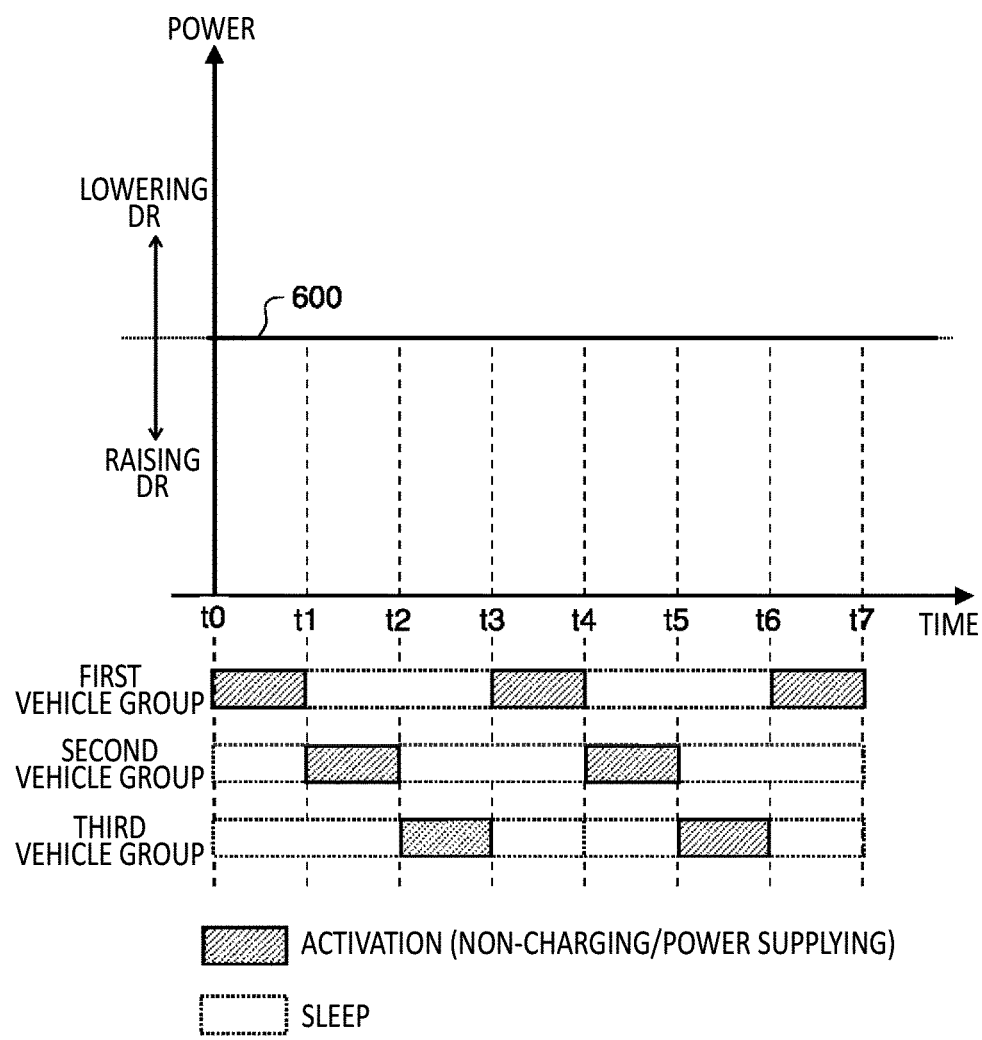
FIG. 6 illustrates a state of each vehicle group in a state where any request of a raising DR or a lowering DR for requesting provision of a primary adjustment force is not notified.

FIG. 6 illustrates a state of each vehicle group in a state where any request of a raising DR or a lowering DR for requesting provision of the primary adjustment force is not notified. It is assumed that time to in FIG. 6 is a time within a power transfer period agreed in the power market.

As illustrated in FIG. 6, the supply and demand balance of power in the power network 90 is established, and the power consumption is also in a substantially constant state. In this case, any request of the raising DR or the lowering DR is not issued. In this case, among the vehicles 10 of the first vehicle group 301, the second vehicle group 302, and the third vehicle group 303 selected as the vehicles for providing the primary adjustment force, only the vehicle 10 of the first vehicle group 301 is in the activated state, and the second vehicle group 302 and the third vehicle group 303 are in the sleep state. Since the supply and demand balance of power in the power network 90 is established, the state of the vehicle 10 in the first vehicle group 301 is the non-charging/power supplying state where charging and power supply are not performed in the activated state.

At time t1 when a certain period of time has elapsed from time to, an activation request is transmitted to the vehicle 10 in the second vehicle group 302 under the control of the control unit 240 of the system 100. As a result, the vehicle 10 in the second vehicle group 302 transitions from the sleep state to the activated state. When the vehicle 10 in the second vehicle group 302 transitions to the activated state, a sleep request is transmitted to the vehicle 10 in the first vehicle group 301 under the control of the control unit 240 of the system 100. As a result, the vehicle which provides the primary adjustment force is switched from the vehicle 10 of the first vehicle group 301 to the vehicle 10 of the second vehicle group 302. Since the supply and demand balance of power in the power network 90 is established, the state of the vehicle 10 in the second vehicle group 302 becomes the non-charging/power supplying state where charging and power supply are not performed in the activated state.

At time t2 when a certain period of time has elapsed from time t1, an activation request is transmitted to the vehicle 10 of the third vehicle group 303 under the control of the control unit 240 of the system 100. As a result, the vehicle 10 in the third vehicle group 303 transitions from the sleep state to the activated state. When the vehicle 10 in the third vehicle group 303 transitions to the activated state, a sleep request is transmitted to the vehicle 10 in the second vehicle group 302 under the control of the control unit 240 of the system 100. As a result, the vehicle that provides the primary adjustment force is switched from the vehicle 10 of the second vehicle group 302 to the vehicle 10 of the third vehicle group 303. Since the supply and demand balance of power in the power network 90 is established, the state of the vehicles 10 in the third vehicle group 303 becomes the non-charging/power supplying state in which charging and power supply are not performed in the activated state.

At time t3 when a certain period of time has elapsed from time t2, an activation request is transmitted to the vehicle 10 in the first vehicle group 301 under the control of the control unit 240 of the system 100. As a result, the vehicle 10 in the first vehicle group 301 transitions from the sleep state to the activated state. When the vehicle 10 in the first vehicle group 301 transitions to the activated state, a sleep request is transmitted to the vehicle 10 in the third vehicle group 303 under the control of the control unit 240 of the system 100. As a result, the vehicle that provides the primary adjustment force is switched from the vehicle 10 of the third vehicle group 303 to the vehicle 10 of the first vehicle group 301. Since the supply and demand balance of power in the power network 90 is established, the state of the vehicles 10 in the first vehicle group 301 becomes the non-charging/power supplying state in which charging and power supply are not performed in the activated state.

Thereafter, the switching process at times t1, t2, and t3 is repeated. As a result, the vehicle 10 in the first vehicle group 301, the vehicle 10 in the second vehicle group 302, and the vehicle 10 in the third vehicle group 303 are selected as the vehicles for providing the primary adjustment force in the order of the vehicle 10 in the first vehicle group 301, the vehicle 10 in the second vehicle group 302, the vehicle 10 in the third vehicle group 303, the vehicle 10 in the first vehicle group 301, and so on. That is, the vehicle 10 in the first vehicle group 301, the vehicle 10 in the second vehicle group 302, and the vehicle 10 in the third vehicle group 303 repeat the transition between the activation state and the sleep state every time a certain period elapses, and the vehicle 10 in one vehicle group of the first vehicle group 301, the second vehicle group 302, and the third vehicle group 303 enters the activated state. By selecting the vehicle 10 for providing the primary adjustment force by rotation in this manner, it is possible to suppress an increase in the activation time of the vehicle 10. Therefore, the power consumption of the vehicle 10 can be reduced.

Figure 7:
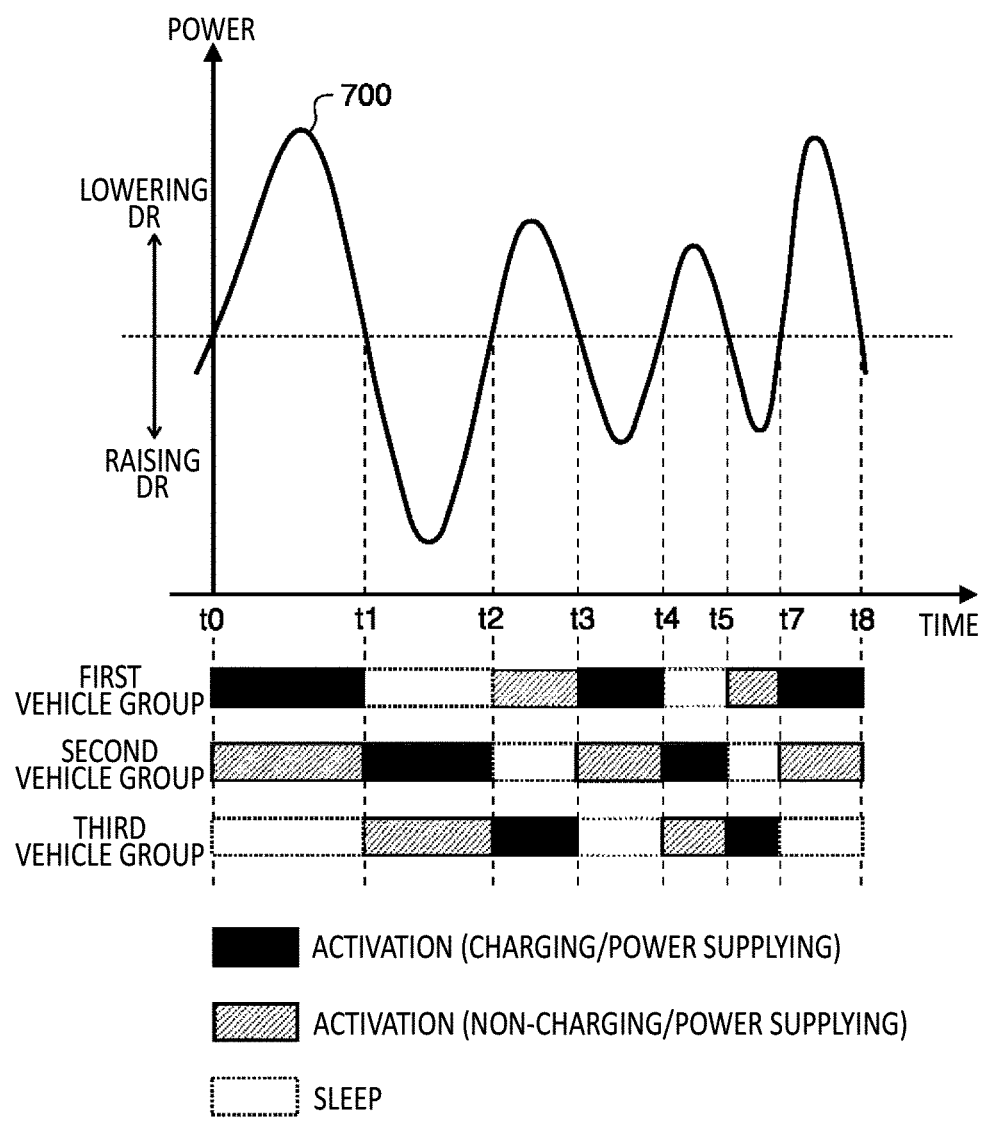
FIG. 7 illustrates a state of each vehicle group in a state where the raising DR request and the lowering DR request for requesting the provision of the primary adjustment force are notified.

FIG. 7 illustrates a state of each vehicle group in a state where the raising DR request and the lowering DR request for requesting the provision of the primary adjustment force are notified. The supply and demand balance of power in the power network 90 is not established, and as illustrated in FIG. 7, the power demand fluctuates in a microscopic view. In this case, among the vehicles 10 in the first vehicle group 301, the second vehicle group 302, and the third vehicle group 303 selected as the vehicles for providing the primary adjustment force, the power supply states of the vehicle 10 in the first vehicle group 301 and the vehicle 10 in the second vehicle group 302 are turned on to be in the activated state, and only the third vehicle group 303 is in the sleep state.

Herein, in response to the lowering DR request, the vehicle 10 in first vehicle group 301 responds to the lowering DR request by discharging the battery 12 to supply power to power network 90 or by reducing the amount of charge if battery 12 is being charged. On the other hand, although the second vehicle group is activated, the second vehicle group 302 is in the non-charging/power supplying state.

At time t1, the period of the lowering DR ends, and the raising DR request is issued. At this time, the vehicle 10 of the second vehicle group 302 becomes in the state corresponding to the raising DR. An activation request is transmitted to the vehicle 10 of the third vehicle group 303 under the control of the control unit 240 of the system 100. As a result, the vehicle 10 in the third vehicle group 303 transitions from the sleep state to the activated state. When the vehicle 10 in the third vehicle group 303 transitions to the activated state, a sleep request is transmitted to the vehicle 10 in the first vehicle group 301 under the control of the control unit 240 of the system 100. As a result, the vehicle which provides the primary adjustment force is switched from the vehicle 10 of the first vehicle group 301 to the vehicle 10 of the second vehicle group 302.

At time t2, the period of the raising DR ends, and the lowering DR request is issued. At this time, the vehicle 10 of the third vehicle group 303 becomes in the state corresponding to the lowering DR. An activation request is transmitted to the vehicle 10 of the first vehicle group 301 under the control of the control unit 240 of the system 100. As a result, the vehicle 10 in the first vehicle group 301 transitions from the sleep state to the activated state. When the vehicle 10 in the first vehicle group 301 transitions to the activated state, a sleep request is transmitted to the vehicle 10 in the second vehicle group 302 under the control of the control unit 240 of the system 100. As a result, the vehicle that provides the primary adjustment force is switched from the vehicle 10 of the second vehicle group 302 to the vehicle 10 of the third vehicle group 303.

At time t3, the period of the lowering DR ends, and the raising DR request is issued. At this time, the vehicle 10 of the first vehicle group 301 becomes in the state corresponding to the raising DR. An activation request is transmitted to the vehicle 10 of the second vehicle group 302 under the control of the control unit 240 of the system 100. As a result, the vehicle 10 in the second vehicle group 302 transitions from the sleep state to the activated state. When the vehicle 10 in the second vehicle group 302 transitions to the activated state, a sleep request is transmitted to the vehicle 10 in the third vehicle group 303 under the control of the control unit 240 of the system 100. As a result, the vehicle that provides the primary adjustment force is switched from the vehicle 10 of the third vehicle group 303 to the vehicle 10 of the first vehicle group 301.

Thereafter, the same switching process is repeated each time the raising DR is switched to the lowering DR. As a result, the vehicle 10 in the first vehicle group 301, the vehicle 10 in the second vehicle group 302, and the vehicle 10 in the third vehicle group 303 are selected as the vehicles for providing the primary adjustment force in the order of the vehicle 10 in the first vehicle group 301, the vehicle 10 in the second vehicle group 302, the vehicle 10 in the third vehicle group 303, the vehicle 10 in the first vehicle group 301, and so on. That is, each time the vehicle 10 in the first vehicle group 301, the vehicle 10 in the second vehicle group 302, and the vehicle 10 in the third vehicle group 303 are switched from the raising DR to the lowering DR, the transition between the charging/power supplying state of the activated state, the sleep state, and the non-charging/power supplying state in the activated state is repeated, and the vehicle 10 in one vehicle group of the first vehicle group 301, the second vehicle group 302, and the third vehicle group 303 is selected as the vehicle which provides the primary adjustment force.

By selecting the vehicle 10 for providing the primary adjustment force by rotation in this manner, it is possible to suppress an increase in the activation time of the vehicle 10. Therefore, the power consumption of the vehicle 10 can be reduced. In addition, the vehicle 10 selected as the vehicle for providing the primary adjustment force is selected as the vehicle for providing the primary adjustment force through the non-charging/power supplying state in the activated state after entering the sleep state. As a result, it is possible to suppress a decrease in response with respect to the switching of the output.

Figure 8:
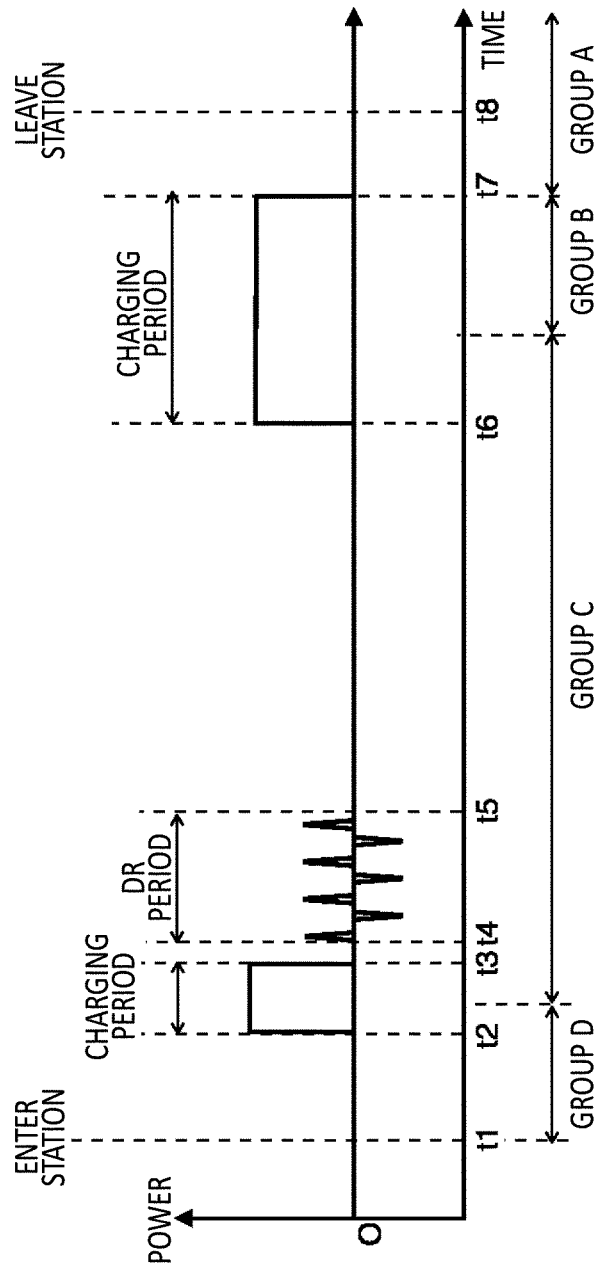
FIG. 8 schematically illustrates a lapse of time related to charging and discharging of one vehicle 10d.

FIG. 8 schematically illustrates a lapse of time related to charging and discharging of one vehicle 10d. At time t1, the vehicle 10d enters the station 30 and is connected to the station 30. At this time, the SOC of the battery 12 mounted on the vehicle 10d is relatively low, and thus it is assumed that the vehicle 10d belongs to the group D.

When the control unit 240 determines that it is time t8 at which the vehicle 10d is predicted to leave the station 30 and there is a sufficient time for charging the vehicle 10d until time t8, the control unit 240 does not immediately start charging the battery 12 of the vehicle 10d. The time t8 at which the vehicle 10d is predicted to leave the station 30 is determined on the basis of the past travel history of the vehicle 10d, the charge-discharge history of the battery 12d included in the vehicle 10d, and the use plan of the vehicle 10.

When the DR period, which is a transfer period for providing the primary adjustment force to the power network 90, approaches, the control unit 240 increases the number of vehicles 10 belonging to the group C in order to increase the number of vehicles 10 that can provide the primary adjustment force. The control unit 240 starts charging the battery 12d between time t2 and time t3 such that vehicle 10d transitions to the group C. This charge increases the SOC of the battery 12d, and the vehicle 10d transitions to the group C.

Subsequently, the control unit 240 causes a plurality of vehicles 10 including the vehicle 10d to provide the primary adjustment force to the power network 90 in the DR period from time t4 to t5. Thereafter, when the predicted departure time t8 of the vehicle 10d approaches, the control unit 240 starts charging the vehicle 10d at time t6 such that the SOC of the battery 12d reaches a target value at the start of traveling of the vehicle 10d by time t8, and the charging is completed at time t7. During the charging period from time t6 to time t7, the SOC of the battery 12d increases, and the vehicle 10d transitions to the group B. Thereafter, the SOC of the battery 12d increases, and the vehicle 10a transitions to the group A at time t7 when the charging of the SOC is completed. At time t8, the vehicle 10d leaves the station 30.

Figure 9:
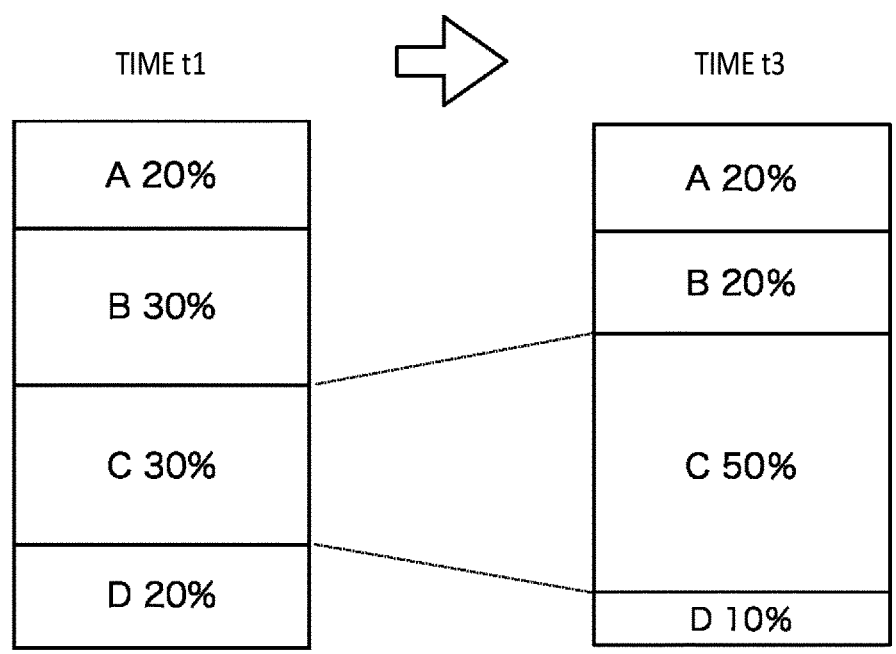
FIG. 9 illustrates a change in a ratio of the number of the vehicles 10 belonging to groups A to D.

FIG. 9 illustrates a change in a ratio of the number of the vehicles 10 belonging to the groups A to D. At time t1 sufficiently before the start time of the DR period illustrated in FIG. 8, the number of the vehicles 10 belonging to group C is 30%. When the DR period approaches, the control unit 240 preferentially charges the vehicle 10 belonging to the group D and preferentially supplies power from the vehicle 10 belonging to the group B to the power network 90. As a result, by increasing the number of the vehicles 10 belonging to the group C to 50% by time t3, it is possible to increase the number of the vehicles 10 that can provide the primary adjustment force to the power network 90 in the DR period.

On the basis of the past travel history of the vehicle 10 and the charge-discharge history of the battery 12, the control unit 240 predicts the time when the vehicle 10 enters the station 30, the time when the vehicle 10 leaves the station 30, and the SOC of the battery 12 when the vehicle 10 enters or leaves the station 30. The control unit 240 estimates the power, which can be provided by each vehicle 10 to the power network 90 in the DR period, on the basis of these predictions, and creates the charging/discharging plan of the battery 12 before the start time of the DR period, such that the power which is required to be provided to the power network 90 can be provided in the DR period. The control unit 240 performs control to charge or discharge the battery 12 on the basis of the charging/discharging plan, so that the number of the vehicles 10 belonging to the group C before the start time of the DR period becomes equal to or larger than a predetermined number. The control unit 240 selects the vehicle for providing the primary adjustment force to the power network 90 in the DR period from the vehicles 10 belonging to the group C. Then, the control unit 240 divides the selected vehicle 10 into three vehicle groups as related to FIGS. 6, 7, and the like, sequentially selects the vehicle group for providing the primary adjustment force, and maintains at least a part of the other vehicle groups in the sleep state. As a result, it is possible to reduce the power consumed when the vehicle 10 is put on standby in a state where the power supply state is turned on in order to provide the primary adjustment force.

In the above description, the vehicle 10 which provides the primary adjustment force is selected from the vehicles 10 belonging to the group C. However, the vehicle 10 which provides the primary adjustment force may be selected from the vehicles 10 belonging to the group B and the group C according to the necessary amount of the primary adjustment force.

In addition, in the above description, the primary adjustment force is provided by using the battery 12 mounted on the vehicle 10. However, in addition to the battery 12 mounted on the vehicle 10 or instead of the battery 12 mounted on the vehicle 10, the battery 12 for the vehicle 20 may be used to provide the primary adjustment force through the station 30d.

Figure 10:
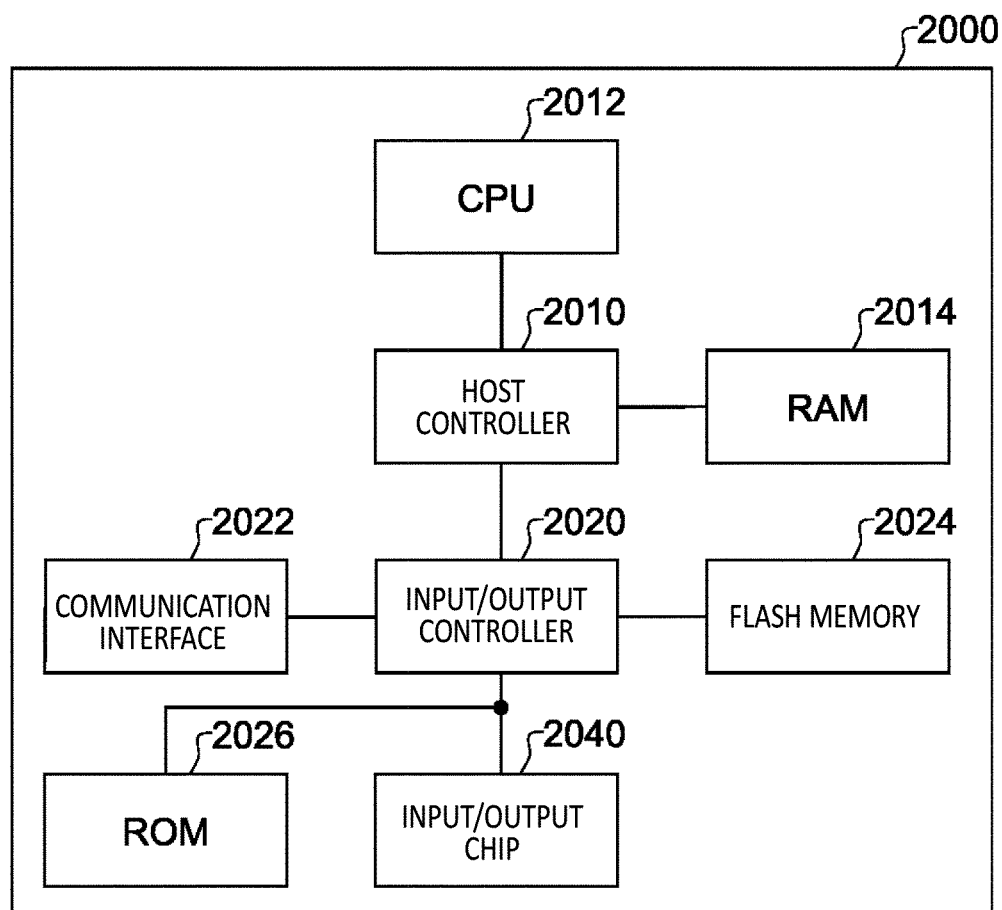
FIG. 10 illustrates an example of a computer 2000.

FIG. 10 shows an example of a computer 2000 in which a plurality of embodiments of the present invention may be entirely or partially embodied. A program installed in the computer 2000 can cause the computer 2000 to function as a system or each unit of the system, a device such as various control devices, or each unit of the device according to the embodiment to execute an operation associated with the system or each unit of the system, the device, or each unit of the device and/or execute a process or a step of the process according to the embodiment. Such a program may be executed by a CPU 2012 to cause the computer 2000 to perform certain operations associated with the processing procedures described herein and some of or all of the blocks in the block diagrams.

The computer 2000 according to the present embodiment includes the CPU 2012 and RAM 2014, which are connected mutually by a host controller 2010. The computer 2000 also includes a ROM 2026, a flash memory 2024, a communication interface 2022, and an input/output chip 2040. The ROM 2026, the flash memory 2024, the communication interface 2022 and the input/output chip 2040 are connected to the host controller 2010 via an input/output controller 2020.

The CPU 2012 operates according to the program stored in the ROM 2026 and the RAM 2014, thereby controlling each unit.

The communication interface 2022 communicates with other electronic devices via a network. The flash memory 2024 stores the program and data used by the CPU 2012 in the computer 2000. The ROM 2026 stores a boot program or the like executed by the computer 2000 during activation, and/or a program depending on hardware of the computer 2000. The input/output chip 2040 may also connect, to the input/output controller 2020, a variety of input/output unit such as a keyboard, a mouse, and a monitor, via input/output ports such as a serial port, a parallel port, a keyboard port, a mouse port, a monitor port, a USB port, and HDMI (registered trademark) port.

A program is provided via a network or computer-readable storage media such as a CD-ROM, a DVD-ROM, or a memory card. The RAM 2014, the ROM 2026, or the flash memory 2024 is an example of the computer-readable storage medium. The program is installed in the flash memory 2024, the RAM 2014 or the ROM 2026 and executed by the CPU 2012. Information processing described in the program is read by the computer 2000, thereby resulting in cooperation between the program and above-described various types of hardware resources. An apparatus or method may be constituted by implementing the operations or processing on information according to the use of the computer 2000.

For example, when communications are performed between the computer 2000 and external devices, the CPU 2012 may execute a communication program loaded in the RAM 2014, and instruct the communication interface 2022 to execute communication processing on based on the processes written in the communication program. The communication interface 2022, under the control of the CPU 2012, reads out transmission data stored in a transmission buffer processing area provided in a recording medium such as the RAM 2014 and the flash memory 2024, transmits the read transmission data to the network, and writes a reception data received from the network into a reception buffer processing area or the like provided on the recording medium. Also, the CPU 2012 may cause all or required portions of a file or a database stored in the recording medium such as the flash memory 2024 to be read by the RAM 2014, and perform various kinds of processes on the data on the RAM 2014. The CPU 2012, then, writes back the processed data into the recording medium.

Various types of programs and various types of information such as data, tables, and databases may be stored in the recording medium, and they may be performed information processing. The CPU 2012 may perform, on the data read from the RAM 2014, various kinds of processing including various kinds of operations, information processing, conditional judgments, conditional branching, unconditional branching, information searching/replacing and the like described in the specification and specified by an instruction sequence of the program, and writes back the result into the RAM 2014. Also, the CPU 2012 may search for information in a file, a database, etc., in the recording medium. For example, when a plurality of entries each having an attribute value of a first attribute respectively associated with an attribute value of a second attribute is stored in the recording medium, the CPU 2012 may search for, from among the plurality of entries, an entry in which the attribute value of the first attribute is specified and that match with a condition, read the attribute value of the second attribute stored in the entry, and thereby obtain the attribute value of the second attribute associated with the first attribute meeting a predetermined condition.

The programs or software modules described above may be stored in the computer-readable storage medium on the computer 2000 or in the vicinity of the computer 2000. A recording medium such as a hard disk or a RAM provided in a server system connected to a dedicated communication network or the Internet can be used as the computer-readable storage media. A program stored in the computer-readable storage medium may be provided to the computer 2000 via a network.

A program that is installed in the computer 2000 and causes the computer 2000 to function as the system 100 may work on the CPU 2012 and the like to cause the computer 2000 to function as each unit of the system 100, respectively. Information processing described in these programs are read into the computer 2000 to cause the computer to function as each unit of the system 100, which is a specific means realized by cooperation of software and the various types of hardware resources described above. Then, with these specific means, by realizing computing or processing of information according to an intended use of the computer 2000 in the present embodiment, the specific system 100 is constructed according to the intended use.

Various embodiments have been described by referring to the block diagrams and the like. In the block diagram, each block may represent (1) a step of a process in which an operation is executed, or (2) each unit of the device having a role of executing the operation. Certain steps and sections may be implemented by dedicated circuitry, programmable circuitry supplied with computer-readable instructions stored on computer-readable storage media, and/or processors supplied with computer-readable instructions stored on computer-readable storage media. Dedicated circuit may include digital and/or analog hardware circuits and may include integrated circuits (IC) and/or discrete circuits. Programmable circuit may include reconfigurable hardware circuits including logical AND, logical OR, logical XOR, logical NAND, logical NOR, and other logical operations, flip-flops, registers, memory elements, etc., such as field-programmable gate arrays (FPGA), programmable logic arrays (PLA), etc.

Computer-readable storage media may include any tangible device that can store instructions for execution by a suitable device, such that the computer-readable storage medium having instructions stored therein forms at least a portion of an article of manufacture including instructions which can be executed to create means for performing processing operations or operations specified in the block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, special purpose computer, or other programmable data processing device, or to programmable circuit, locally or via a local area network (LAN), wide area network (WAN) such as the Internet, etc., to execute the computer-readable instructions to provide means for performing described processing procedure or operations specified in the block diagrams. Examples of the processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

10: vehicle;
20: vehicle;
42: personal house;
44: facility;
12: battery;
30: station;
70: power consumer;
80: power generation device;
90: power network;
180: server;
190: communication network;
200: processing unit;
210: acquisition unit;
240: control unit;
280: storage unit;
290: communication device;
100: system;
2000: computer;
2010: host controller;
2012: CPU;
2014: RAM;
2020: input/output controller;
2022: communication interface;
2024: flash memory;
2026: ROM; and
2040 input/output chip.

What is claimed is:

1. A system comprising:
a control unit configured to select, from among a plurality of vehicles, a vehicle to be put on standby in a state where a power supply state is turned on to be able to provide a power resource to a power network, and perform control to bring the selected vehicle into a state where the power resource is able to be provided to the power network, and to cause another vehicle to sleep, wherein the control unit is configured to sequentially select a vehicle, which is to be put on standby in a state where the power resource is able to be provided in order to provide a primary adjustment force to the power network, from among a plurality of vehicles belonging to a same group of groups divided by estimating an amount of power resource which is able to be provided to the power network, and the control unit is configured to switch, when the primary adjustment force is provided to the power network, a state of each of at least three vehicle groups selected from among the plurality of vehicles belonging to a same group, from a first state which is a state where the power resource is provided on the power network, a second state which is a state where the power resource is able to be provided to the power network and the power resource is not provided to the power network, and a third state which is a sleep state, in an order of being selected in a predetermined order.

2. The system according to claim 1, wherein
the control unit is further configured to, when the primary adjustment force is not provided to the power network,
bring one vehicle group of the at least three vehicle groups to the second state and bring two other two vehicle groups of the at least three vehicle groups to the third state, and
switch the state of each vehicle group of the at least three vehicle groups from the second state and the third state in the order of being selected in the predetermined order.

3. The system according to claim 1, wherein
the control unit is configured to
divide the plurality of vehicles into three or more groups on a basis of a state of charge of a battery included in each of the plurality of vehicles, and sequentially select a vehicle, which is to be put on standby in a state where the power resource is able to be provided in order to provide the primary adjustment force, from among a plurality of vehicles belonging to a group, which excludes a group having a highest state of the charge and a group having a lowest state of the charge, among the three or more groups.

4. The system according to claim 3, wherein
the battery is a battery which is mounted on the vehicle and is exchangeable at a station which charges the battery.

5. The system according to claim 1, wherein
the control unit is further configured to
divide the plurality of vehicles into three or more groups on a basis of a state of charge of a battery included in each of the plurality of vehicles, and
sequentially select a vehicle, which is to be put on standby in a state where the power resource is able to be provided in order to provide the primary adjustment force, from among a plurality of vehicles belonging to a group, which excludes a group having a highest state of the charge and a group having a lowest state of the charge, among the three or more groups.

6. The system according to claim 2, wherein
the control unit is further configured to
divide the plurality of vehicles into three or more groups on a basis of a state of charge of a battery included in each of the plurality of vehicles, and
sequentially select a vehicle, which is to be put on standby in a state where the power resource is able to be provided in order to provide the primary adjustment force, from among a plurality of vehicles belonging to a group, which excludes a group having a highest state of the charge and a group having a lowest state of the charge, among the three or more groups.

7. The system according to claim 5, wherein
the battery is a battery which is mounted on the vehicle and is exchangeable at a station which charges the battery.

8. The system according to claim 6, wherein
the battery is a battery which is mounted on the vehicle and is exchangeable at a station which charges the battery.

9. A non-transitory computer-readable storage medium having recorded thereon a program that causes a computer to function as:
a control unit configured to select, from among a plurality of vehicles, a vehicle to be put on standby in a state where a power supply state is turned on to be able to provide a power resource to a power network, and perform control to bring the selected vehicle into a state where the power resource is able to be provided to the power network, and to cause another vehicle to sleep, wherein
the control unit is configured to sequentially select a vehicle, which is to be put on standby in a state where the power resource is able to be provided in order to provide a primary adjustment force to the power network, from among a plurality of vehicles belonging to a same group of groups divided by estimating an amount of power resource which is able to be provided to the power network, and
the control unit is configured to switch, when the primary adjustment force is provided to the power network, a state of each of at least three vehicle groups selected from among the plurality of vehicles belonging to a same group, from a first state which is a state where the power resource is provided on the power network, a second state which is a state where the power resource is able to be provided to the power network and the power resource is not provided to the power network, and a third state which is a sleep state, in an order of being selected in a predetermined order.

10. A method comprising:
selecting, from among a plurality of vehicles, a vehicle to be put on standby in a state where a power supply state is turned on to be able to provide a power resource to a power network; and
performing control to bring the vehicle selected in the selecting into a state where a power resource is able to be provided to the power network, and to cause another vehicle to sleep, wherein
the selecting includes sequentially selecting a vehicle, which is to be put on standby in a state where the power resource is able to be provided in order to provide a primary adjustment force to the power network, from among a plurality of vehicles belonging to a same group of groups divided by estimating a providable power resource, and
the performing control switches, when the primary adjustment force is provided to the power network, a state of each of at least three vehicle groups selected from among the plurality of vehicles belonging to a same group, from a first state which is a state where the power resource is provided on the power network, a second state which is a state where the power resource is able to be provided to the power network and the power resource is not provided to the power network, and a third state which is a sleep state, in an order of being selected in a predetermined order.

* * * * *